United States Patent
Ikegami et al.

(10) Patent No.: US 7,387,085 B2
(45) Date of Patent: Jun. 17, 2008

(54) ANIMAL LITTER

(75) Inventors: Takeshi Ikegami, Tokyo (JP); Takayuki Matsuo, Tokyo (JP); Shingo Shimizu, Tokyo (JP)

(73) Assignee: Uni-Charm Petcare Corporation, Tokyo (JP)

( * ) Notice: Subject to any disclaimer, the term of this patent is extended or adjusted under 35 U.S.C. 154(b) by 147 days.

(21) Appl. No.: 11/206,309

(22) Filed: Aug. 18, 2005

(65) Prior Publication Data

US 2006/0112893 A1 Jun. 1, 2006

(30) Foreign Application Priority Data

Aug. 20, 2004 (JP) ............... 2004-241311
Mar. 23, 2005 (JP) ............... 2005-084643

(51) Int. Cl.
*A01K 1/01* (2006.01)

(52) U.S. Cl. ..................... 119/171

(58) Field of Classification Search ........ 119/171, 119/161, 165, 166, 172, 173
See application file for complete search history.

(56) References Cited

U.S. PATENT DOCUMENTS

| | | | |
|---|---|---|---|
| 4,444,148 A * | 4/1984 | Lander | 119/165 |
| 4,471,717 A * | 9/1984 | Lander | 119/171 |
| 4,829,045 A | 5/1989 | Fransham | |
| 5,025,752 A | 6/1991 | Yananton | |
| 5,271,355 A | 12/1993 | Billings | |
| 5,358,607 A * | 10/1994 | Ellis | 162/100 |
| 5,359,960 A | 11/1994 | Yananton | |
| 5,614,458 A * | 3/1997 | Webb et al. | 502/401 |
| 5,860,391 A * | 1/1999 | Maxwell et al. | 119/173 |
| 6,287,550 B1* | 9/2001 | Trinh et al. | 424/76.6 |
| 6,797,036 B2* | 9/2004 | Funke et al. | 95/90 |
| 2003/0191204 A1 | 10/2003 | Hermann et al. | |
| 2004/0255869 A1* | 12/2004 | Matsuo et al. | 119/170 |
| 2005/0005870 A1* | 1/2005 | Fritter et al. | 119/173 |
| 2005/0132968 A1* | 6/2005 | Swank | 119/171 |
| 2005/0263080 A1 | 12/2005 | Campbell et al. | |
| 2006/0102085 A1 | 5/2006 | Chen | |
| 2006/0112893 A1 | 6/2006 | Ikegami et al. | |
| 2006/0112894 A1 | 6/2006 | Ikegami et al. | |
| 2006/0124069 A1 | 6/2006 | Wong et al. | |
| 2006/0201438 A1* | 9/2006 | Anttila et al. | 119/171 |
| 2006/0243212 A1* | 11/2006 | Jenkins et al. | 119/171 |
| 2007/0017453 A1* | 1/2007 | Fritter et al. | 119/173 |

FOREIGN PATENT DOCUMENTS

| | | |
|---|---|---|
| EP | 0153441 A1 | 9/1985 |
| EP | 0453414 A1 | 10/1991 |
| JP | 09-271283 | 10/1997 |
| JP | 09-313060 | 12/1997 |
| JP | 10-229768 | 9/1998 |
| JP | 11-127713 | 5/1999 |
| JP | 11-318252 | 11/1999 |
| JP | 2000-32860 | 2/2000 |
| JP | 2001-346466 | 12/2001 |
| JP | 2002-142589 | 5/2002 |
| JP | 2005-21071 | 1/2005 |

OTHER PUBLICATIONS

European Patent office Search Report for EP 05 25 5139 issued Jul. 24, 2007.

* cited by examiner

*Primary Examiner*—Yvonne R. Abbott
(74) *Attorney, Agent, or Firm*—Lowe Hauptman Ham & Berner LLP

(57) ABSTRACT

Animal litter includes a plurality of granular materials, each having a water-shedding part and a liquid-absorbing part.

16 Claims, 4 Drawing Sheets

(A)

(B)

ANIMAL LITTER

CROSS-REFERENCE TO RELATED APPLICATIONS

This application is based upon and claims the benefit of priority from Japanese Patent application No.2004-241311 filed on Aug. 20, 2004, and Japanese Patent Application No. 2005-084643 filed on Mar. 23, 2005.

FIELD OF THE INVENTION

The present invention is related to animal litter used as material laid in litter containers for animals such as cats and dogs.

RELATED ART

Plastic box-shaped containers lined with so-called "cat litter", litter comprising granular materials, are used as litter container for animals such as cats and dogs which are kept indoors. Excretory substances, such as urine excreted from an animal, are absorbed by such litter. The pet owner removes litter soiled by urine and feces from the container along with the feces and the like and replenishes it with new litter according to the amount removed. However, cats habitually mix the litter with their feet after excretion, and therefore, a large amount of litter soiled by urine and feces may stick to the cat's feet. Furthermore, because of such cat's motion, the soiled litter is spread, and it becomes difficult to completely eliminate only the soiled portions.

Mineral based zeolite and sand from rivers, bentonite which hardens after absorbing liquid, and cellulose formed by solidifying ground pulp and the like into grains are utilized for litter in such litter containers. However, zeolite and sand from rivers do not absorb urine, and bentonite and pulp not only have poor absorbency, but also have no deodorizing power. Furthermore, the urine of animals, cats in particular, has powerfully foul odor which fills the entire room wherein the litter container is placed and cleaning up of the litter container entailed disgust.

As litter which resolves such issues, a porous water-resistant silica gel having strong deodorizing power and absorbency (for example, refer to Patent Reference 1) has been employed. In addition, a litter made from material having water-shedding properties which suppresses a generation of odors through the combined use of liquid-absorbent sheets which absorb moisture such as urine (for example, refer to Patent Reference 2) has been employed, Patent Reference 1: Japanese Patent No. 2766632

Patent Reference 2: Japanese Patent Laid-Open Publication No. 10-229768

However, the particle diameter of the litter described in Patent Reference 1 is small, 2 mm to 6 mm, in order to reduce the surface area of the litter and space therebetween by reducing the particle diameter and to absorb urine efficiently. In addition, in order to increase the absorption speed and the maximum absorbable amount of liquid by setting the moisture content low, the litter is adjusted to a moisture content of 3% by weight or less after drying at a temperature of 90° C. to 120° C. Thus, this litter has a high absorption speed and can quickly absorb excreted urine and the like. However, it is unsanitary because silica gel which has absorbed large amounts of urine is left in the litter container, and in addition, causes the generation of foul odor.

In addition, because the granular materials which comprise the litter described in Patent Reference 2 do not have liquid-absorbing properties, in case urine remains on the surface of the granular materials without passing therethrough, the remaining urine decomposes and generates foul odors. Furthermore, because moisture from feces, the amount of which is not large enough to flow, cannot pass through the litter, the odor of feces may remain. Therefore, it becomes necessary to discard the soiled portion of the litter every time a pet excretes or completely replace the litter at a pace of once every one or two weeks. Additionally, not only the litter but also the liquid-absorbent sheet must also be exchanged with a fresh sheet, and therefore, large amount of waste is generated.

SUMMARY OF THE INVENTION

The present invention has been made to resolve the foregoing issues. The object thereof is to provide an animal litter for a dual structure litter container which uses both litter and liquid-absorbent sheet, and the animal litter has liquid-passing properties for transferring the majority of liquid excretory substances to the liquid-absorbent sheet and absorbency for enabling moisture which cannot be passed to be absorbed into the litter with the passage of time. The dual structure makes the litter capable of being used for long periods of time.

More specifically, the present invention provides the following:

(1) An animal litter comprising a plurality of granular materials wherein each of the granular materials comprises a shedding part having water-shedding properties and an absorbing part having liquid-absorbing properties.

According to the invention in (1), the absorption speed of the granular material can be suppressed by giving one part of the surface of individual granular materials comprising the litter water-shedding properties. Through this, liquid first quickly passes through the spaces between the granular materials, Then, the liquid remaining on the surface of the granular material is absorbed into the granular materials with the passage of time. Therefore, moisture less remains on the surface of the granular material, and a dry state can be kept easily.

(2) The animal litter according to (1) wherein the area of the shedding part is larger than the area of the absorbing part.

According to the invention in (2), the area of the shedding part is preferably larger than the area of the absorbing part. More specifically, the percentage of the area of the shedding part is preferably 90% or less (by volume), and more preferably, 50% or more. Setting the percentage of the surface area of the shedding part be 50% or more, the absorbing part is in contact with the water-shedding part, liquid does not remain on the surface of the granular materials, and therefore, animal litter of the present invention works effectively.

(3) The animal litter according to (1) or (2) wherein the part having water-shedding properties is treated with water-repellant finish.

According to the invention in (3), a drier state can be kept easily by treating a part of the surface of individual granular materials comprising the litter with water-shedding processing. Water-shedding processing is performed by methods (for example, processing with organic solvent solutions such as acrylic resin, urethane resin, silicone resin and the like, after applying fluorinated water-shedding agent) which have conventionally been performed on base material having liquid-absorbing properties such as silica gel, bentonite, pulp, paper sand, and wood chips. Furthermore, processing for giving liquid-absorbing properties can be performed on base materials originally having water-shedding properties. For example, a method wherein bentonite is adhered to granular materials made of polyethylene and polypropylene and the like with adhesive is employed. Additionally, the shape of the granular material is preferably spherical, pellet-shaped, or tablet-type (pill-shaped) and has a diameter (length) of 4 mm to 14 mm in size.

Furthermore, deodorant for neutralizing the odor of excretory substances can be added to the granular material. Deodorants may be agent that neutralizes ammonia odor which causes urine odor and that suppresses the decomposition of urine and that reduces the putrefactive odor of urine. More specifically, organic acids such as aliphatic carboxylic acid and artificial enzymes such as metal phthalocyanine may be employed. In addition, as deodorant which suppresses the decomposition of urine, thiazoline, organic halogenide, and Ag-zeolite antibacterial agents and the like are employed.

(4) The animal litter according to any one of (1) to (3) wherein a mass of the glanular materials has a liquid absorptive property whereby the mass absorbs in three seconds 20% to 90% of a maximum absorbable amount of liquid that can be absorbed by the mass and the maximum absorbable amount of liquid is 0.3 times to 10 times the weight of the mass.

According to the invention in (4), by setting an amount of liquid absorption by the mass of glanular materials in three seconds 20% to 90% of the maximum absorbable amount of liquid, and the maximum absorbable amount of liquid 0.3 times to 10 times the weight of the mass, liquid easily comes to pass through the granular materials. Then, because the liquid remaining on the surface of the granular material comes to be absorbed into the granular material with the passage of time, moisture takes on hardly remaining on the surface of the granular material and the drier state becomes to be kept easily.

"Absorbable amount of liquid per three seconds" is, for example, the value measured by the procedures 1) to 5) below.

1) As shown in FIG. 5, 100 g of the litter 13 is measured out and placed inside a draining container 402 (for example, a drainer) and pressed from above by a board 403 (for example, stainless steel board) which acts as a weight;
2) The entire draining container 402 is immersed in a water tank 401, which is filled with saline solution 404, for three seconds to a depth wherein the litter 13 is completely immersed;
3) The draining container 402 is removed from the water, the board 403 is removed, the granular materials is sandwiched between a sufficient amount of paper towels (towels with a water retention rate of four times or more is used; the towel must immediately absorb water dropped from a dropper without pooling; for example, preferably used is kimwipes : registered trademark, product of Crecia Corporation) and excess water drops on the surface are removed;
4) The granular materials are again transferred to a fresh paper towel and water drops are removed (when performing a three-second measurement, water drops must be wiped away quickly because measurement errors occur due to absorption of water drops remaining on the surfaces; measurement time is as shown in Table 1);
5) Weight after wiping minus 100 g is the absorbable amount of liquid per 100 g of granular materials.

In addition, "maximum absorbable amount of liquid" refers to "the absorbable amount of liquid per ten minutes" and is determined by the same procedures other than changing "three seconds" to "ten minutes".

TABLE 1

|  | Time required | Time elapsed from start of measurement |
| --- | --- | --- |
| Immerse in water tank | 3.0 seconds | 3.0 seconds |
| Remove and place contents onto Kimu Towel | for 2.0 seconds | 5.0 seconds |
| Cover with Kimu Towel and wipe away excess moisture | for 3.0 seconds | 8.0 seconds |
| Transfer once again to a fresh Kimu Towel | for 5.0 seconds | 13 seconds |
| Wipe away water drops | for 10 seconds | 23 seconds |

(5) The animal litter according to any one of (1) to (4) which is used in combination with liquid-absorbent sheet having liquid-absorbing properties.

According to the invention in (5), by using litter and liquid-absorbent sheet in combination and enabling quick absorption of liquid from excretory substances into the liquid-absorbent sheet, it becomes possible to suppress the generation of odors and, in addition, keep the litter in a dry state. This liquid-absorbent sheet is for absorbing liquid which has passed through the litter according to the present invention and is laid on the bottom surface of the litter container. Litter container used for combinational use of litter and liquid-absorbent sheet like this has a dual structure of a litter storage part for storing litter and a liquid-absorbent sheet storage part for placing the liquid-absorbent sheet, and preferably, the bottom surface part of the litter storage part has a plurality of holes.

(6) The animal litter according to (1) to (5) wherein the mass of the glanular materials has a liquid passing ratio of 50% or more.

[Test Method for Liquid Passing Rate]

"Liquid passing ratio" in the present specification is, for example, the values measured in procedures 1) to 6), described below.

1) As shown in FIG. 6, a weight A of a pet toilet sheet 503 (preferably having properties described hereafter; for example, "Deo-sheet": registered trademark, product of Uni-Charm Petcare Corporation is used preferably) is measured;
2) A cylinder 501 (for example, a cylinder with a diameter of 75 mm and a depth of 30 mm is prepared to fill the litter 13 to a depth of 30 mm) is filled to the top with the litter 13 and leveled;
3) 20.0 g of saline solution 404 is dripped with a funnel 502 from a position 30 mm above the vicinity of the center of the litter 13 in 10 seconds;
4) After dripping, the litter 13 and the cylinder 501 are removed (when removing, place a plastic board over the top of the cylinder and invert the cylinder and the pet toilet sheet so that unnecessary moisture transfer between the litter 13 and the pet toilet sheet 503 does not occur, and then remove the litter 13 and the cylinder 501);
5) Weight B of the pet toilet sheet 503 is measured;
6) $100 \times (B-A)/20 =$ liquid passing ratio As shown in FIG. 7, it is preferable to use a pet toilet sheet 503 wherein, the length w of 5 ml of saline solution flowing on it is no longer than 100 mm, when the sheet is placed along a slope 504 at a 45 degree angle and the 5 ml of saline solution is dripped from a height of 5 cm in one second on the sheet. In addition, it is preferable to use a sheet product having a water retention value of 200 g or more assuming that the sheet product has a size of 45 cm×34 cm, when the water retention value is figured by subtracting its weight before dehydration for 90 seconds by a hydro-extractor (90G) from its weight after the dehydration wherein the sheet product has been soaked in saline solution for ten minutes, then pulled out, hung to drain off the water before it is to be dehydrated.

Because litter is conventionally used with a pet toilet sheet laid beneath a draining board which holds the litter, the foregoing liquid passing ratio can be measured by using a draining board filled with 30 mm of the litter, wherein the draining board is created so that fluid draining is most ideal according to the size of the granular materials.

According to the invention in (6), by setting the liquid passing ratio of the granular materials 50% or more, moisture from excretory substances passes through the litter more easily, and this is particularly effective while the animal litter is used in combination with the liquid absorbent sheet.

As described in the foregoing, the animal litter according to the present invention has high liquid-passage properties, and remaining liquid can be absorbed with the passage of time. Therefore, it is easy to maintain the litter in a state at the beginning of the use, and the generation of foul odor from excretory substances can be restrained.

In addition, the animal litter of the present invention can be used repeatedly for a long period of time, and thus, the amount of waste is small, cleaning is involves little trouble, and is cost-efficient, as well.

DESCRIPTION OF THE PREFERRED EMBODIMENT

The present invention is described in more detail hereafter.

"Animal" according to the present invention includes so-called pets such as dogs, cats, rabbits, and hamsters, additionally baby tigers, lions and the like. In addition, "litter" means a collection of granular materials formed into spheres, spheroids, or polyhedron, and the main material is preferably silica gel. "Liquid" is excreted from an animal and includes all moisture which can be passed through litter according to the present invention. Furthermore, "liquid-passing" means the passage of liquid through a certain point in the litter. Therefore, the larger the amount of liquid flowing through the perimeter of the granular materials is, the better the liquid-passage properties.

<First Embodiment of Litter>

In case silica gel is used as the base material of the litter according to the present invention, it can be granulated into spherical shape and dried by a method as written as below.

First, raw silica gel powder is made into uniform powder by a powdering machine. Next, with the concentrate solution of silica ($SiO_2$) as the main ingredient, adhesive is formed by blending water and other materials (for example, polyvinyl alcohol (PVA)). Subsequently, powdered silica gel is placed in a ball-molding machine, mixed with the adhesive and molded into balls of a diameter of 4 to 10 mm. Finally, this silica gel sphere is placed in a dryer at a temperature of 100 to 140° C. and dried.

Figure 1:
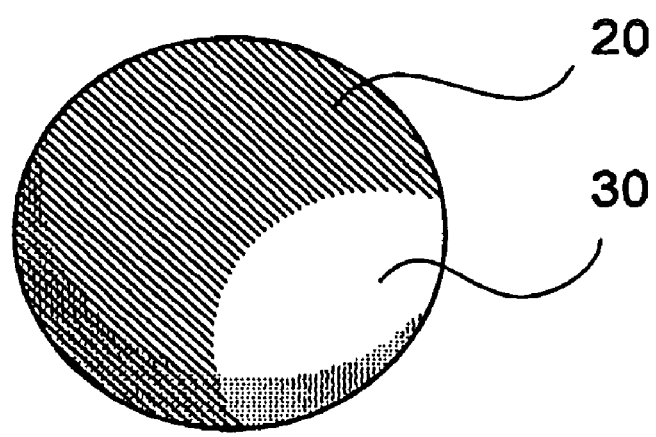
FIG. 1 is a diagram showing one granular material of the first embodiment of the litter according to the present invention.
Figure 2:
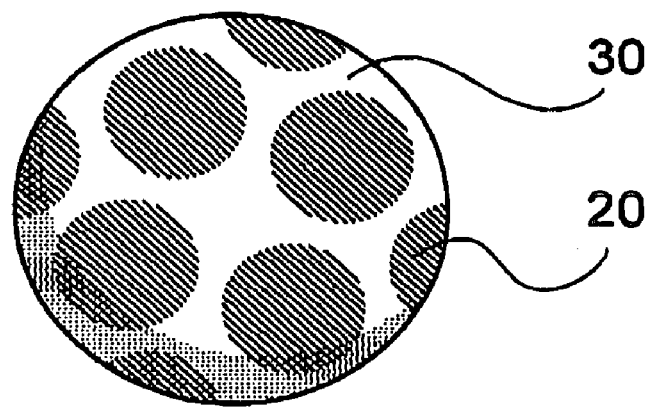
FIG. 2 is a diagram showing the other granular material of the first embodiment of the litter according to the invention.

Silicone and acrylic resin are combined, heated and sprayed on these silica gel spheres with a spray. This can be performed using only silicone or only acrylic resin as well. In addition, a method can also be employed, which silica gel spheres are partially dipped in resin having water-shedding properties such as olefin resin and coated. Furthermore, material having liquid-absorbing properties such as pulp or silica gel can also be combined with resin having water-shedding properties such as polypropylene or polyethylene, heated and molded. Silica gel after water-shedding processing includes that a part 20 having water-shedding properties and a part 30 having liquid-absorbing properties are clearly differentiated as shown in FIG. 1 or that the part 30 having liquid-absorbing properties is uniformly spread throughout its entirety as shown in FIG. 2.

<Second Embodiment of Litter>

Figure 3:
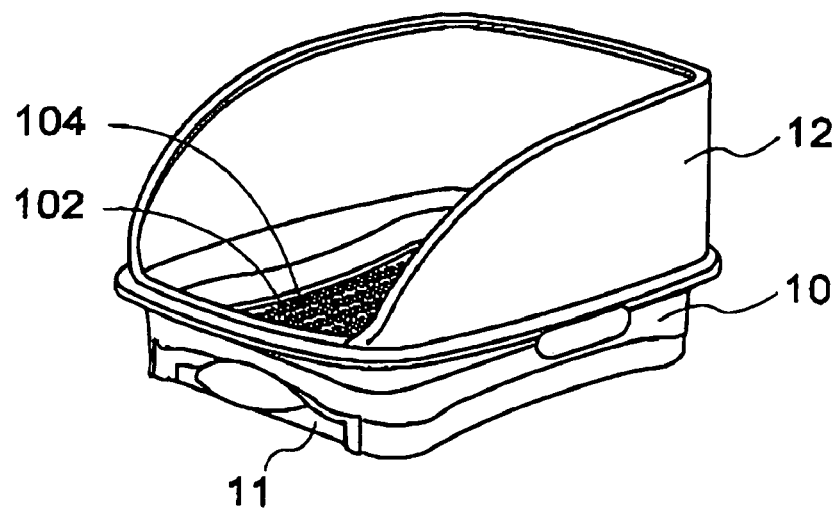
FIG. 3 is a diagram showing an example of the litter in used state according to the invention.
Figure 3:
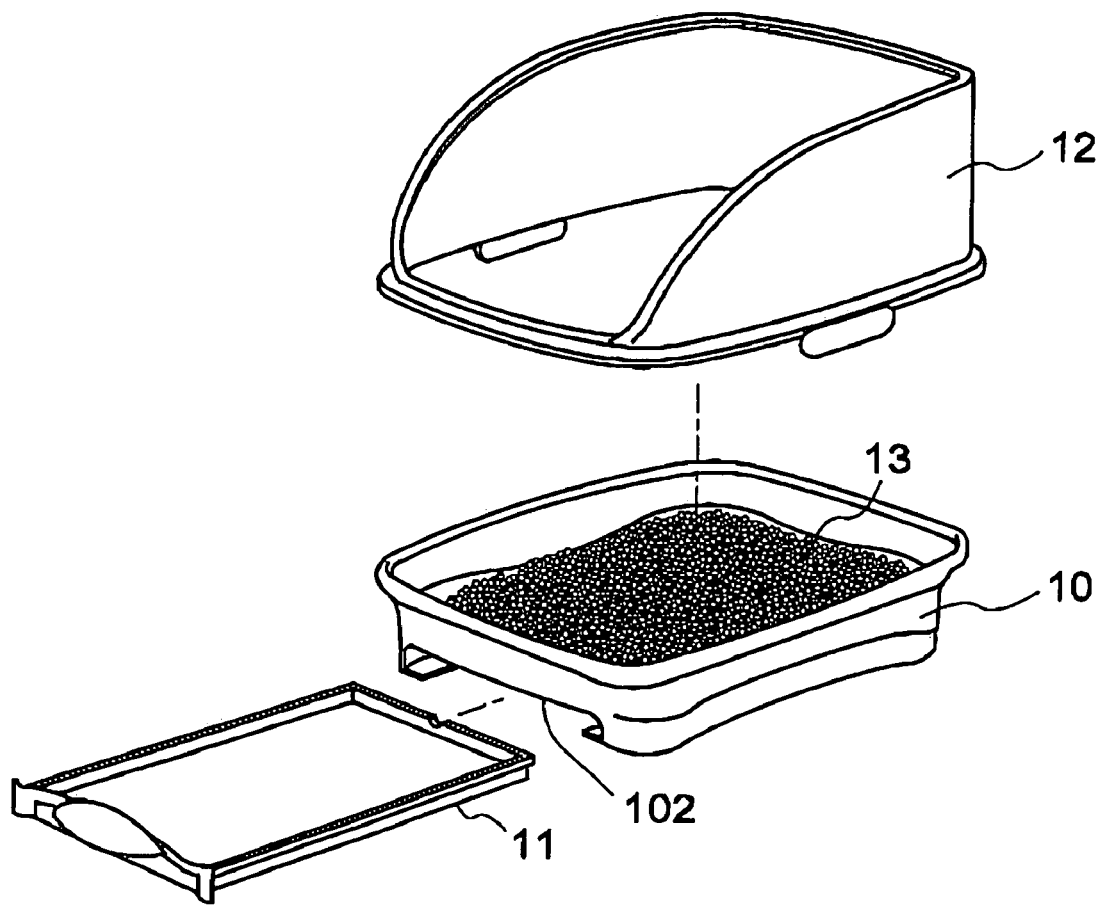
Figure 4:
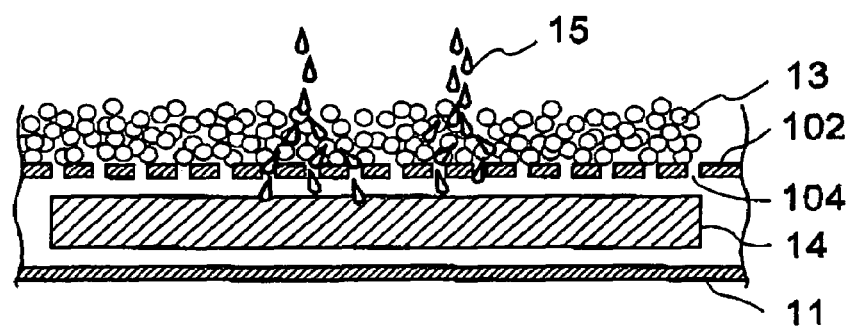
FIG. 4 is a diagram showing partially enlarged view of the litter shown in FIG. 3.
Figure 5:
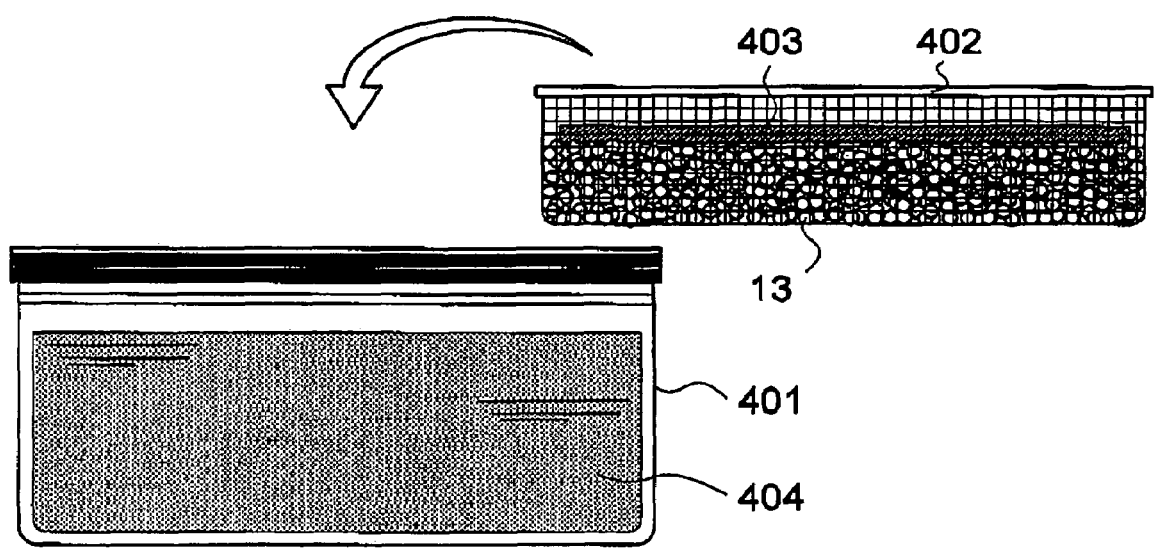
FIG. 5 is a diagram showing the measurement method for absorbable amount of liquid.
Figure 6:
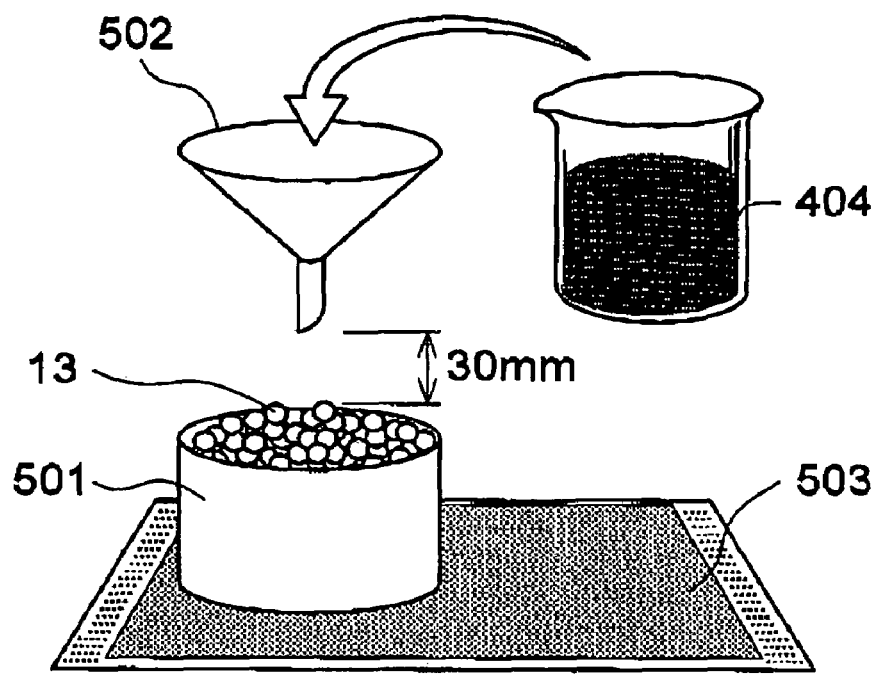
FIG. 6 is a diagram showing the measurement method for liquid passing.
Figure 7:
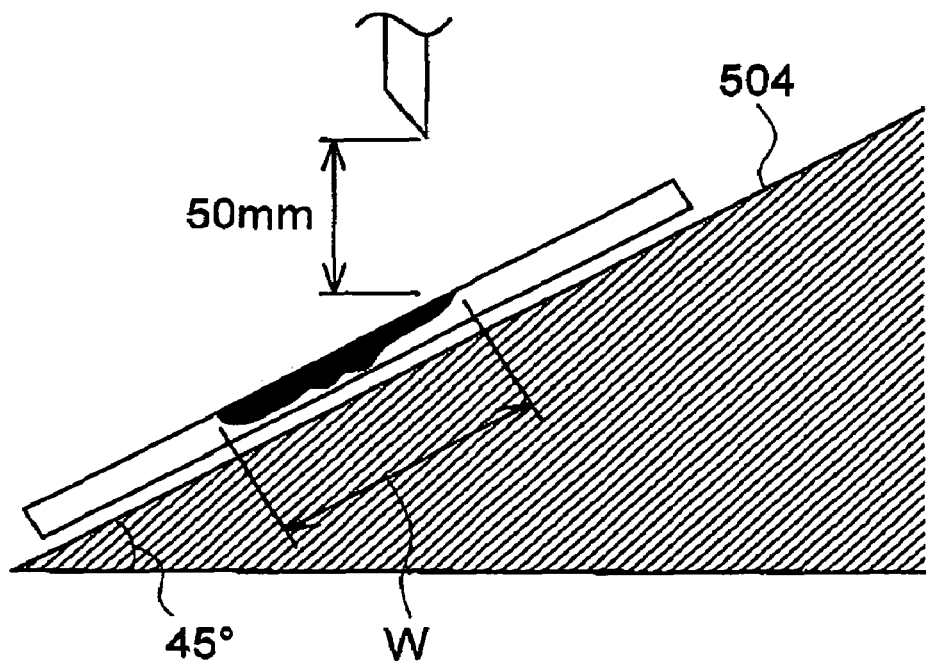
FIG. 7 is a diagram showing the measurement method for water retention amount in selection of pet toilet sheets.

FIG. 3 is a diagram showing animal litter of the embodiment of the present invention, and FIG. 4 is a partially enlarged diagram of the cross-section of the litter container shown in FIG. 3 which stores the animal litter 13 and the liquid absorbent sheet 14 in the X-X direction.

The animal litter according to the present invention is constructed with a box-shaped litter storage container 10 for storing litter comprising of a large amount of granular materials, a liquid-absorbent sheet storage container 11 for storing liquid-absorbent sheet 14 which is located below the storage container 10 and is assembled to be inserted and removed at will, and a side surface cover 12 which is placed to cover the side surfaces above the litter storage container 10 as the main components. The bottom surface part 102 of the litter storage container 10 has a plurality of holes 104. These holes 104 are preferably polyhedron or circular, and are preferably of a size wherein litter 13 will not fall out.

As shown in FIG. 3(B), a predetermined amount of litter 13 is laid in layers on the upper surface of the bottom surface part 102 of the litter storage container 10. In addition, liquid-absorbent sheet 14 is placed within the liquid-absorbent sheet storage container 11.

FIG. 4 shows the cross-sectional view of the litter container storing litter 13 and liquid-absorbent sheet 14 of the present invention. When an animal excretes, liquid 15 first passes among litter 13, passes through holes 104 placed in the bottom surface part 102 of litter storage container 10, and is absorbed by the liquid-absorbent sheet 14 laid within liquid-absorbent sheet storage container 11. Then liquid 15 remaining in the litter 13 is absorbed within litter 13 with the passage of time.

What is claimed is:

1. An animal litter, comprising a granular material wherein each particle of the granular material comprises a shedding part having water-shedding properties and an absorbing part having liquid-absorbing properties;
   wherein the liquid-absorbing properties are such that a mass of the granular material absorbs in three seconds 20% to 90% of a maximum absorbable amount of liquid that can be absorbed by the mass, and the maximum absorbable amount of liquid is 0.3 times to 10 times the weight of the mass.

2. The animal litter according to claim 1, wherein the shedding part is treated with water-repellant finish.

3. The animal litter according to claim 2, wherein the mass of the granular material has a liquid passing ratio of 50% or more.

4. The animal litter according to claim 3, wherein the area of the shedding part is larger than the area of the absorbing part.

5. In combination,
the animal litter according to claim 4, and
a liquid-absorbent sheet having liquid-absorbing properties for use with said animal litter.

6. In combination,
the animal litter according to claim 3, and
a liquid-absorbent sheet having liquid-absorbing properties for use with said animal litter.

7. The animal litter according to claim 2, wherein the area of the shedding part is larger than the area of the absorbing part.

8. In combination,
the animal litter according to claim 7, and
a liquid-absorbent sheet having liquid-absorbing properties for use with said animal litter.

9. In combination,
the animal litter according to claim 2, and
a liquid-absorbent sheet having liquid-absorbing properties for use with said animal litter.

10. The animal litter according to claim 1, wherein the mass of the granular material has a liquid passing ratio of 50% or more.

11. The animal litter according to claim 10, wherein the area of the shedding part is larger than the area of the absorbing part.

12. In combination,
the animal litter according to claim 11, and
a liquid-absorbent sheet having liquid-absorbing properties for use with said animal litter.

13. In combination,
the animal litter according to claim 10, and
a liquid-absorbent sheet having liquid-absorbing properties for use with said animal litter.

14. In combination,
the animal litter according to claim 1, and
a liquid-absorbent sheet having liquid-absorbing properties for use with said animal litter.

15. The animal litter according to claim 1, wherein the area of the shedding part is larger than the area of the absorbing part.

16. In combination,
the animal litter according to claim 15, and
a liquid-absorbent sheet having liquid-absorbing properties for use with said animal litter.

* * * * *